(12) United States Patent
Huang

(10) Patent No.: US 7,755,885 B2
(45) Date of Patent: Jul. 13, 2010

(54) HOUSING OF PORTABLE ELECTRONIC DEVICES AND METHOD FOR MANUFACTURING THE SAME

(75) Inventor: Nan-Tsung Huang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 593 days.

(21) Appl. No.: 11/618,981

(22) Filed: Jan. 2, 2007

(65) Prior Publication Data
US 2008/0106857 A1    May 8, 2008

(30) Foreign Application Priority Data
Nov. 3, 2006    (CN)   .................. 2006 1 0063471

(51) Int. Cl.
*H05K 5/03*    (2006.01)
(52) U.S. Cl. .............. 361/679.3; 361/679.56; 361/679.02; 361/679.08; 341/22; 400/472; 345/168
(58) Field of Classification Search ............ 361/679.02, 361/679.08, 679.3, 679.56
See application file for complete search history.

(56) References Cited

U.S. PATENT DOCUMENTS

| | | | | |
|---|---|---|---|---|
| 6,574,098 | B2* | 6/2003 | Netzel et al. | 361/679.3 |
| 7,050,292 | B2* | 5/2006 | Shimura et al. | 361/679.01 |
| 7,348,512 | B2* | 3/2008 | Iohara | 200/341 |
| 2003/0132507 | A1* | 7/2003 | Odaira | 257/620 |
| 2005/0236737 | A1* | 10/2005 | Lu | 264/275 |
| 2007/0172664 | A1* | 7/2007 | Peng et al. | 428/411.1 |

* cited by examiner

*Primary Examiner*—Jayprakash N Gandhi
*Assistant Examiner*—Ingrid Wright
(74) *Attorney, Agent, or Firm*—Jeffrey T. Knapp

(57) ABSTRACT

A housing (100) of portable electronic devices includes a main body (10) and a decorative layer (16). The main body defines a through groove (12) therein and a recessed portion (14) sunken from an outer surface thereof. The groove is formed adjacent to the recessed portion. The decorative layer is formed on the outer surface of the main body and extending in the groove and the recessed portion. A method for manufacturing the housing is also provided.

13 Claims, 4 Drawing Sheets

HOUSING OF PORTABLE ELECTRONIC DEVICES AND METHOD FOR MANUFACTURING THE SAME

BACKGROUND OF THE INVENTION

1. Field of the Invention

The present invention generally relates to housings of portable electronic devices and, more particularly, to a housing of portable electronic devices with a quality finish and a method for manufacturing the housing.

2. Description of Related Art

With the ongoing development of microcircuitry and multimedia technologies, portable electronic devices such as mobile telephones and laptops are now in widespread use. Housings of these portable electronic devices are mainly manufactured by means of insert molding. Generally, when making a housing, a main body of a housing is firstly formed. The main body is inserted into a mold, and molten plastic is injected into the mold. After the plastic solidifies, a decorative layer is formed on the main body.

However, because the main body has different thickness for different portions, the decorative layer formed on the main body also has different thickness in its different portions. When the plastic for forming the decorative layer solidifies, the decorative layer shrinks unevenly in different portions. Therefore some wrinkles are formed on boundaries between the portions having different decorative layer thicknesses. These wrinkles destroy aspect of the housing, and latter manufacturing procedures of the housing are interfered with by the wrinkles.

Therefore, an improved housing of portable electronic device and a method of manufacturing the housing are desired in order to overcome the above-described shortcomings.

SUMMARY OF THE INVENTION

In one aspect, a housing of portable electronic devices includes a main body and a decorative layer. The main body defines a through groove therein and a recessed portion sunken from an outer surface thereof. The groove is formed adjacent to the recessed portion. The decorative layer is formed on the outer surface of the main body and extending in the groove and the recessed portion.

In another aspect, a method for manufacturing a housing includes these steps: forming a main body; forming a groove and a recessed portion adjacent to the groove in the main body, the recessed portion sunken from an outer surface of the main body; and forming a decorative layer on the outer surface main body and in the groove and the recessed portion.

Other advantages and novel features will become more apparent from the following detailed description when taken in conjunction with the accompanying drawings.

BRIEF DESCRIPTION OF THE DRAWINGS

Many aspects of the housing and the method for manufacturing the housing can be better understood with reference to the following drawings. The components in the drawings are not necessarily drawn to scale, the emphasis instead being placed upon clearly illustrating the principles of the housing. Moreover, in the drawings like reference numerals designate corresponding parts through out the several views.

DETAILED DESCRIPTION OF THE INVENTION

Figure 1:
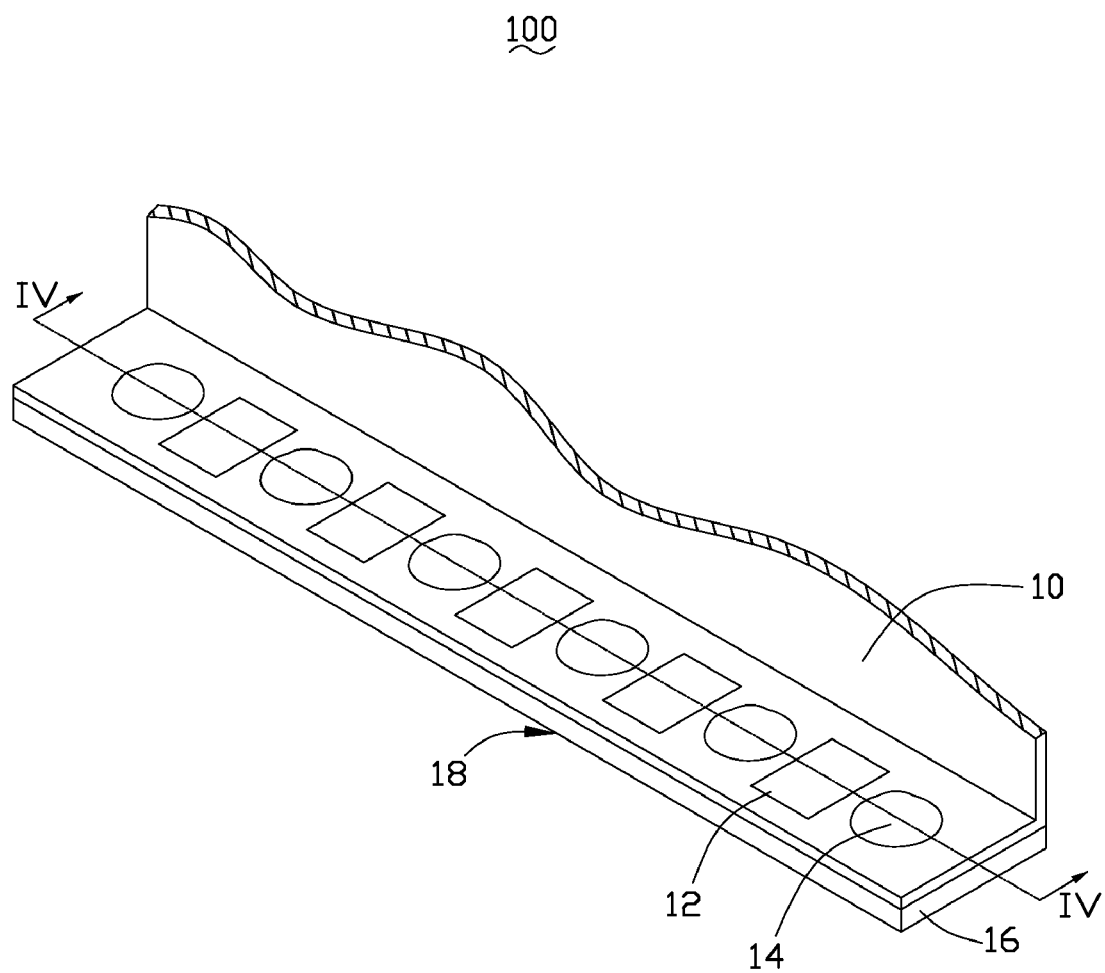
FIG. 1 is a schematic view of a housing in accordance with a preferred embodiment of the present invention.

Referring now to the drawings in detail, FIG. 1 shows a housing 100 in accordance with a preferred embodiment of the present invention. The housing 100 is used in portable electronic devices such as mobile telephones and laptops. The housing 100 includes a main body 10 and a decorative layer 16 formed on the main body 10.

Figure 2:
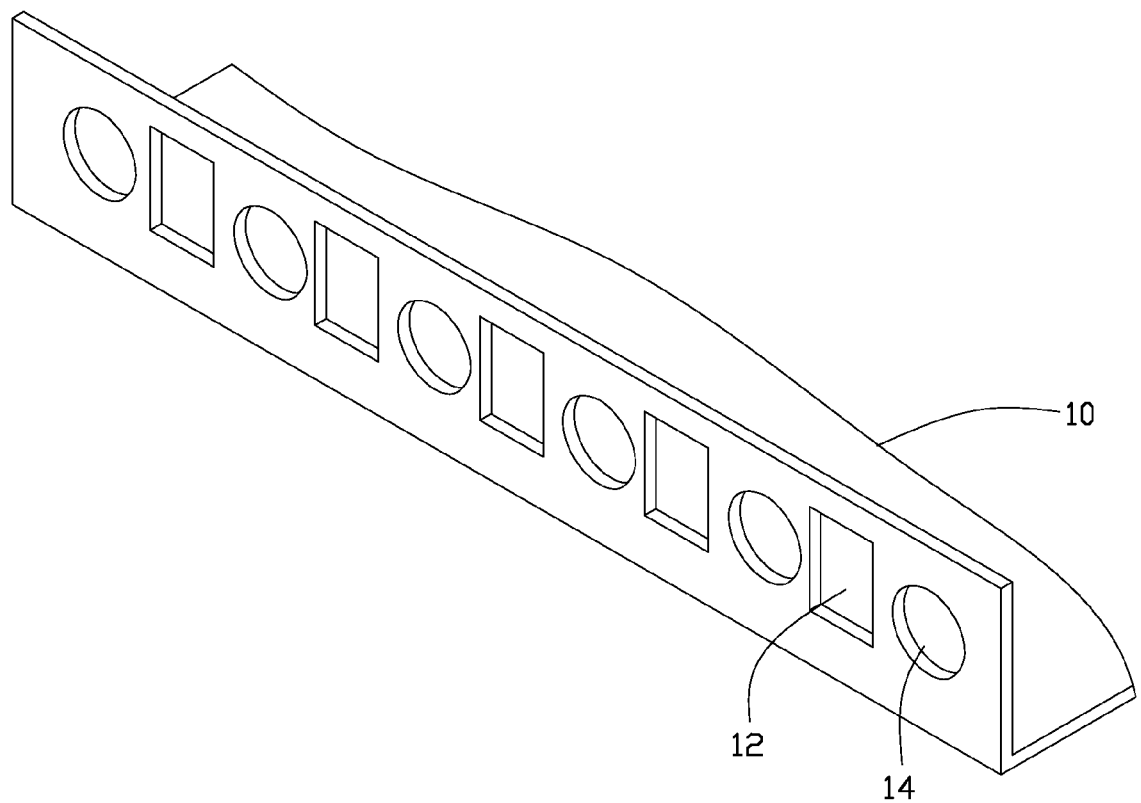
FIG. 2 is a schematic view of a main body of the housing shown in FIG. 1.
Figure 3:
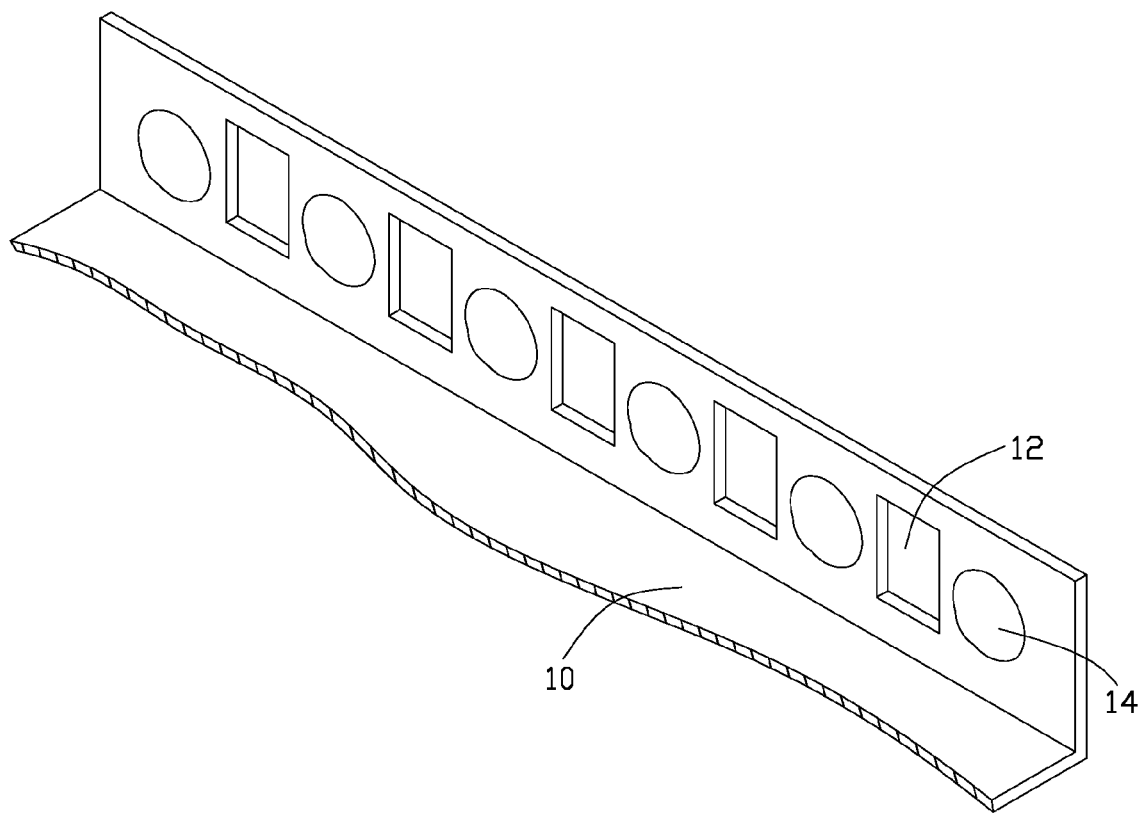
FIG. 3 is similar to FIG. 2, but viewed from another aspect.

Also referring to FIG. 2 and FIG. 3, the main body 10 is made of metal such as alloy-steel, magnesium alloy or aluminum alloy, etc. The main body 10 defines a plurality of grooves 12 and a plurality of recessed portions 14 therein. The grooves 12 are arranged adjacent to the recessed portions 14 and alternate with the recessed portions 14. The grooves 12 are rectangular, and the recessed portions 14 are round. Each groove 12 runs through the main body 10. The recessed portions 14 are slightly sunken from an outer surface of the main body 10. A sunken depth of the recessed portions 14 is approximately equal to that of the grooves 12 and a thickness of the main body 10.

Figure 4:
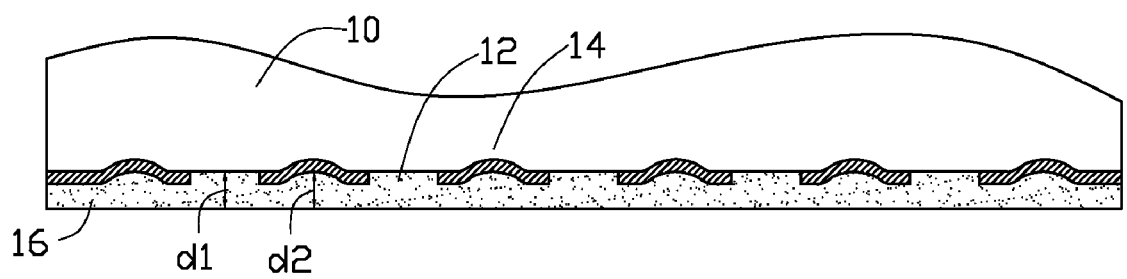
FIG. 4 is a schematic, cut-away view along the line IV-IV of the housing shown in FIG. 1.

Also referring to FIG. 4, the decorative layer 16 is made of plastic such as acrylonitrile-butadiene-styrene (ABS), polycarbonate (PC), etc. The decorative layer 16 is formed on an outer surface of the main body 10, and in the grooves 12 and the recessed portions 14. The decorative layer 16 includes a decorative surface 18 for beautifying the housing 100. Because a depth of the grooves 12 is approximately equal to the sunken depth of the recessed portions 14, a thickness d1 of the decorative layer 16 in the grooves 12 is approximately equal to a thickness d2 of the decorative layer 16 in the recessed portions 14.

A method for manufacturing the housing 100 in accordance with a preferred embodiment of the present invention includes the following steps:

forming a main body 10, wherein the main body 10 can be made of metal such as alloy-steel, magnesium alloy, aluminum alloy, etc.;

forming a plurality of grooves 12 on the main body 10, wherein the grooves 12 can be formed by means of molding or punching;

forming a plurality of recessed portions 14 on the main body 10, wherein the recessed portions 14 can be formed by means of punching, and the recessed portions 14 are arranged to be adjacent to the grooves 12 and alternate with the grooves 12; the grooves 12 and the recessed portions 14 are different in shape;

forming a decorative layer 16 on an outer surface of the main body 10 and in the grooves 12 and the recessed portions 14; the decorative layer 16 is formed by means of insert molding which comprises steps of inserting the main body 10 into a mold, and injecting melting plastic into the mold, thus the plastic forms a decorative layer 16 on the outer surface of the main body 10 and in the grooves 12 and the recessed portions 14; and after the plastic solidifies, opening the mold, and then removing the finished housing 100.

In this method of manufacturing the housing 100, because the depth of the grooves 12 is approximately equal to that of the recessed portions 14, a large part of the decorative layer 16 has approximately even thickness. Therefore the decorative layer 16 shrinks evenly when the plastic solidifies. Additionally, because the grooves 12 and the recessed portions 14 are different in shape, the plastic in grooves 12 and the recessed portions 14 shrinks along different directions when solidifying. In this way, distinct wrinkles formed on the decorative layer 16 are much reduced.

Understandably, according to require quality of the housing 100, number of the grooves 12 and the recessed portions 14 can be reduced to at least one. Depth of the grooves 12 and the recessed portions 14 can be changed. Either the grooves 12 or the recessed portions 14 can run through the main body 10 or not, but a depth of the grooves 12 needs to be approximately equal to that of the recessed portions 14. The grooves 12 and the recessed portions 14 can also be of other shapes, but the grooves 12 and the recessed portions 14 should be of different shapes for reducing wrinkles.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A housing of portable electronic devices, comprising:
   a main body, the main body defining a plurality of through grooves therein and a plurality of recessed portions sunken from an outer surface thereof, the through grooves being formed adjacent to the recessed portions and arranged to alternate with the recessed portions; and
   a decorative layer, the decorative layer being formed on the outer surface of the main body and extending in the through grooves and the recessed portions.

2. The housing as claimed in claim 1, wherein the through groove and the recessed portion are different in shape.

3. The housing as claimed in claim 1, wherein the through groove is formed by means of molding and/or punching.

4. The housing as claimed in claim 1, wherein the recessed portion is formed by means of punching.

5. The housing as claimed in claim 1, wherein the decorative layer is formed on the main body by means of insert molding after the main body is formed.

6. A method for manufacturing a housing, comprising steps of:
   forming a main body;
   forming a plurality of through grooves and a plurality of recessed portions adjacent to the through groove in the main body, the recessed portion sunken from an outer surface of the main body, and the grooves arranged to alternate with the recessed portions; and
   forming a decorative layer on the outer surface of the main body and in the through groove and the recessed portion.

7. The method as claimed in claim 6, wherein the through groove and the recessed portion are different in shape.

8. The method as claimed in claim 6, wherein the through groove is formed by means of molding and/or punching.

9. The method as claimed in claim 6, wherein the recessed portion is formed by means of punching.

10. The method as claimed in claim 6, wherein the decorative layer is formed on the main body by means of insert molding after the main body is formed.

11. A housing of a portable electronic device comprising:
    a main body defining a plurality of through grooves therein and a plurality of recessed portions sunken from an outer surface thereof, the through grooves and the recessed portions being arranged alternately; and
    a decorative layer being formed on the outer surface of the main body and extending into the through grooves and the recessed portions, wherein a depth of each of the through grooves is equal to a sunken depth of each of the recessed portions so that the decorative layer has a substantially uniform thickness in the through grooves and the recessed portions.

12. The housing as claimed in claim 11, wherein the through grooves and the recessed portions have different figuration.

13. The housing as claimed in claim 11, wherein the decorative layer is integrally formed on the main body by means of insert molding after the main body is formed.

* * * * *